No. 679,576. Patented July 30, 1901.
A. V. RYDER.
CULTIVATOR.
(Application filed Nov. 26, 1900.)
(No Model.) 3 Sheets—Sheet 1.

No. 679,576. Patented July 30, 1901.
A. V. RYDER.
CULTIVATOR.
(Application filed Nov. 26, 1900.)
(No Model.) 3 Sheets—Sheet 2.

WITNESSES:
C. Theobald
Matthew Siebler

A. V. Ryder
INVENTOR.
By R. J. McCarty
ATTORNEY.

No. 679,576. Patented July 30, 1901.
A. V. RYDER.
CULTIVATOR.
(Application filed Nov. 26, 1900.)
(No Model.) 3 Sheets—Sheet 3.
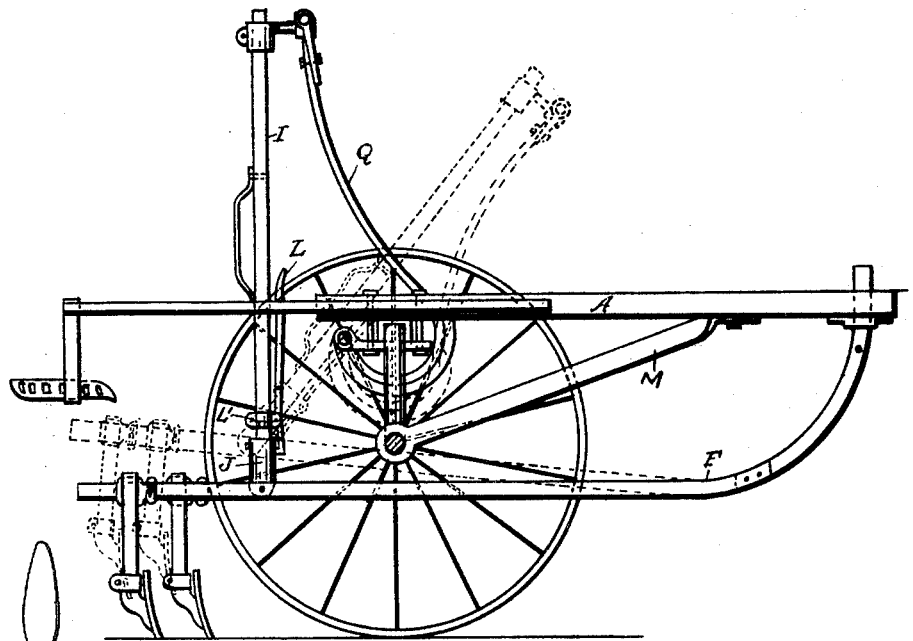
Fig. 4.
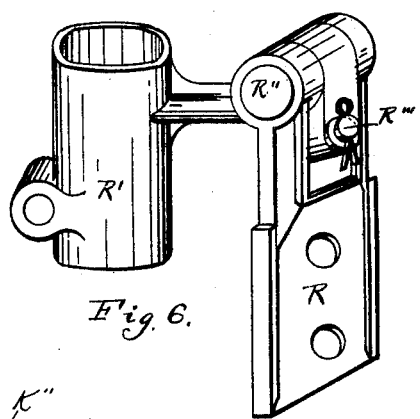
Fig. 6.
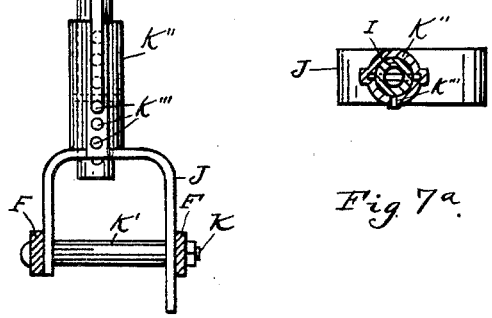
Fig. 7.
Fig. 7a.
WITNESSES:
Carl S. Noe.
C. Theobald.
A. V. Ryder.
INVENTOR.
By R. J. M'Carty
his ATTORNEY.

UNITED STATES PATENT OFFICE.

ANDREW V. RYDER, OF CADIZ, OHIO.

CULTIVATOR.

SPECIFICATION forming part of Letters Patent No. 679,576, dated July 30, 1901.

Application filed November 26, 1900. Serial No. 37,769. (No model.)

*To all whom it may concern:*

Be it known that I, ANDREW V. RYDER, a citizen of the United States, residing at Cadiz, in the county of Harrison and State of Ohio, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to riding-cultivators and is an improvement of the cultivator patented by me September 19, 1899, the number of said patent being 633,160.

The main object of the invention is to provide means for shifting the weight of the frame forward of the wheel-spindles, whereby the cultivator-frame is evenly balanced when the beams are raised from the ground, and thus the pole is prevented from raising up against the horses' necks. In the present invention this means is only to a small extent dependent for its operation upon manual assistance, while in my former patent the means therein shown for equalizing the weight of the frame when the beams are raised is dependent entirely upon manual effort.

The invention also consists in other improvements of a structural nature which enhance the efficiency of the cultivator and which will be hereinafter described.

Figure 1:
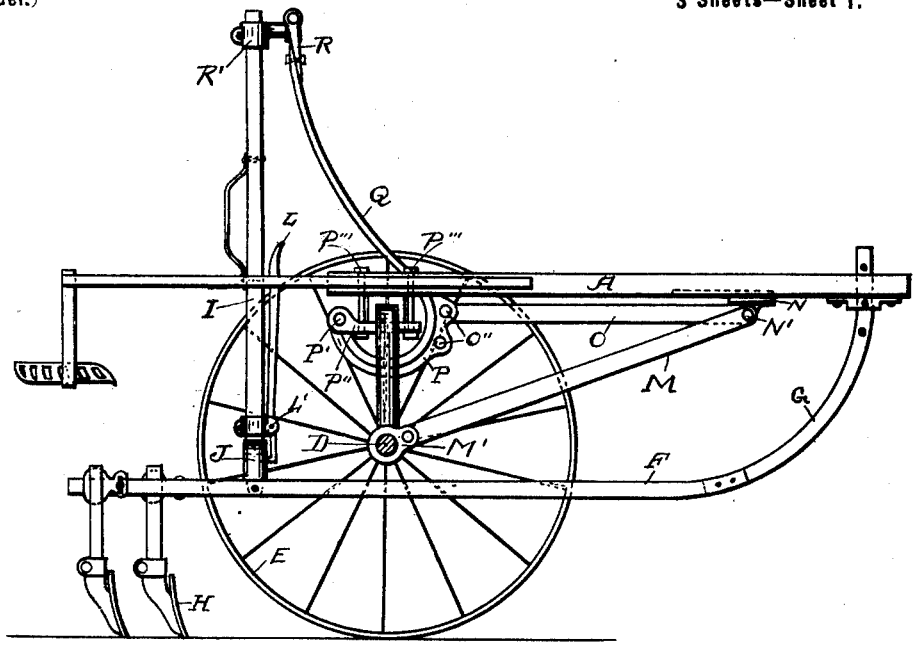
Figure 2:
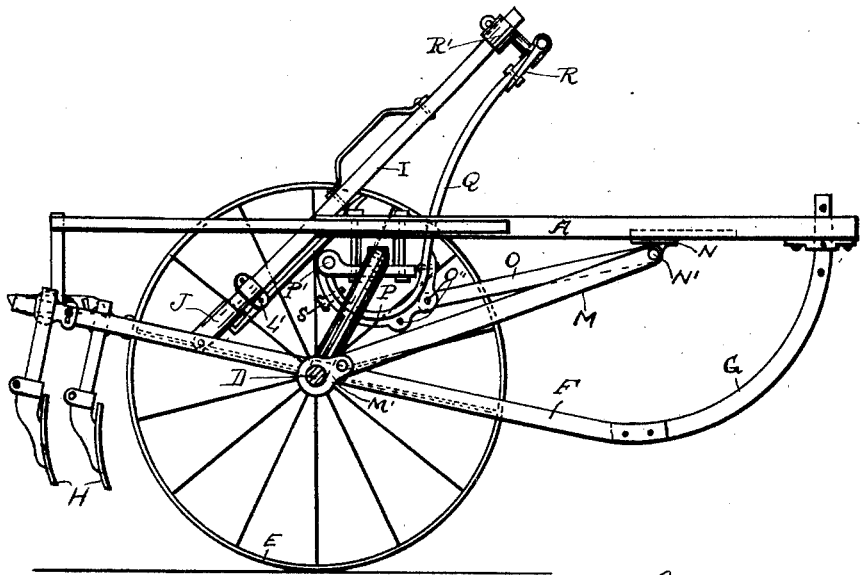
Figure 3:
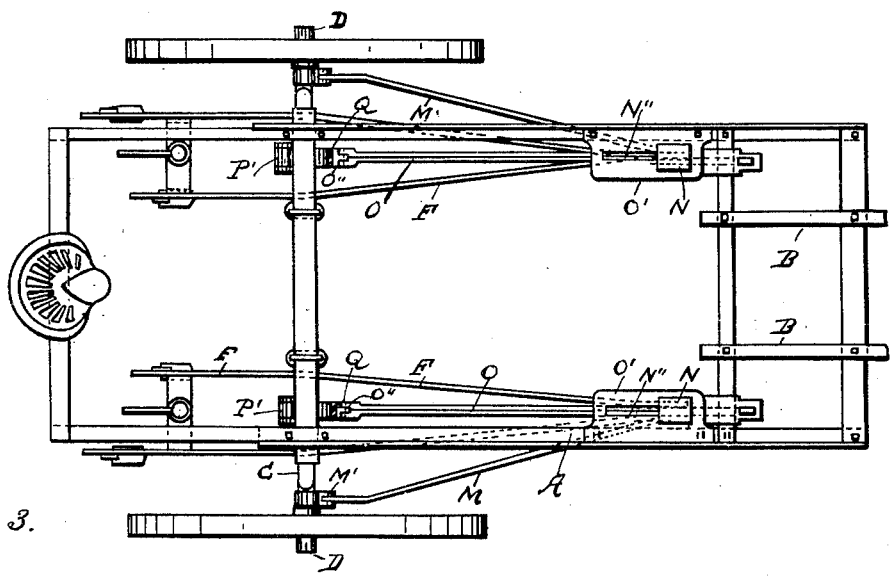
Figure 5:
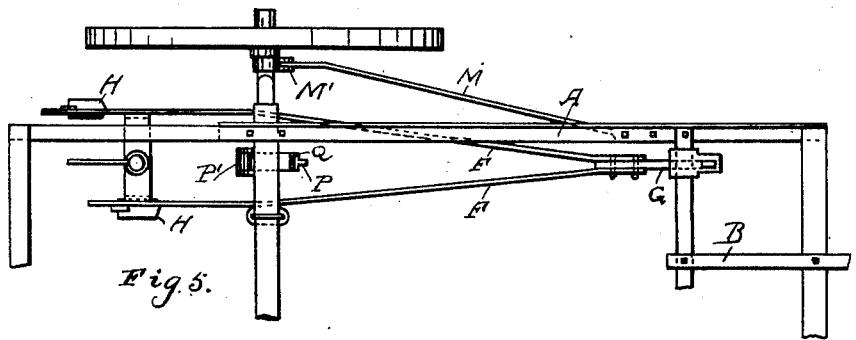
Figure 8:
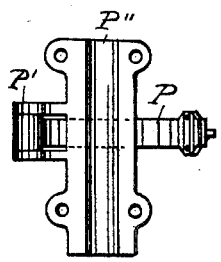
Figure 9:
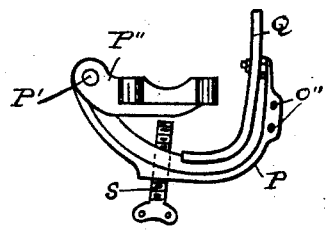

In the accompanying drawings, Figure 1 is a side elevation with one of the wheels removed, showing the cultivator in an operative position. Fig. 2 is a similar view showing the cultivator-beams in an inoperative or raised condition. Fig. 3 is a plan view of the cultivator. Fig. 4 is a side elevation with one of the wheels removed. This view shows some structural variation. Fig. 5 is a plan view of one side of the cultivator in accordance with Fig. 4. Fig. 6 is an enlarged perspective view of one of the swivels or universal joints which connect the standards and lifting-springs. Fig. 7 is an enlarged front elevation of the device for regulating the positions of the cultivator-beams when the nature of the soil requires an adjustment of the beams. Fig. 7ª is a cross-section on the line $x\ x$ of Fig. 7; Fig. 8, an enlarged plan view of the lower part of one of the axle-boxes and the spring-support which is hinged thereto. Fig. 9 is an elevation of Fig. 8.

The cultivator illustrated in the accompanying drawings is a well-known form, consisting of a rectangular frame A, to the front end of which a pole B is attached. The frame is supported by an axle C, the ends of which drop and terminate in spindles D, upon which the ground-wheels E are mounted. Cultivator-beam F is pivoted to a curved bar G, the latter being adjustable up and down in the frame, whereby the cultivator-shovels H are adjusted to run deeper or shallower, as the conditions may require. A standard I is connected to the rear end of the cultivator-beam by the following devices:

J is a stirrup or yoke with which the beam has a pivotal connection by means of a bolt K, which passes through the beam and through a sleeve K' between the inner sides of the yoke. The upper portion of the yoke terminates in a hollow portion or sleeve K", which is provided with a series of openings K'''. (See Figs. 7 and 7ª.) The lower end of the standard I is likewise provided with similar openings and telescopes in the sleeve K".

L is a spring-controlled hand-lever having a fulcrum on the standard I at L'. The lower end of said lever is turned in and is of a suitable size to enter the openings K''' in the sleeve K" and those in the standard, and thus forms a detent to hold the standard at any position within the range of the vertical row of openings therein. The lower end of the lever or the detent is removed from said openings to permit of an adjustment of the beam by pressing the upper end of the lever L toward the standard. This adjustment of the beam to a lower or higher position may be done instantly without stopping the team.

M is a drag-bar which has a pivotal connection with the wheel-spindles by means of a collar M'. The upper end of said drag-bar has a similar connection at N' with a slide N. Brace-bar O has also a pivotal connection at N' with said slide. The latter—to wit, slide N— is movable back and forth in guide-slots N" in plate O', which is secured to the frame. The rear end of brace O has an adjustable connection at O" with lifting-spring support P, which consists of a curved casting. (Shown in Fig. 9.) The spring-support P has a pivotal connection at P' with the lower half of the axle-box P'', said lower portion of the axle-box being secured by arch-bolts P'''. The support P has rigidly attached to it a lifting-spring Q, substantially of the curvature shown in the drawings. The upper end of said lifting-spring has a swivel connection with the upper end of standard I by means of a plate R, to which the upper end of said spring is secured, and a sleeve or socket-piece R', which fits over the end of the standard. The plate R has a pivotal or hinge connection at R'', and the sleeve R' has a pivotal connection at R''', so that these two parts—to wit, R and R'—have arc movements at right angles to each other. (See Fig. 6.)

As shown in Fig. 1, the beam is lowered and the cultivator is in working condition. When the beam is thus lowered, the lifting-spring Q is incapable of exerting any lifting effect on said beam, as the draft or tension on said spring is rearward of the pivotal point P', and the brace-bar O being in the upper or horizontal position the spring is locked in such position and the spring alone controls the position of the cultivator-beam while the cultivator is working. When the brace O is in such position, the slide N is at the limit of its forward movement and the pivotal connections N', O'', and P' are in line and the wheel-spindles are maintained in a vertical plane with the centers of the axle-boxes. The moment, however, the operator moves forward the standard I to a position to bring the upper end of said lifting-spring slightly forward of the pivotal joint P' the brace O is lowered and the spring by virtue of its own strength or tension draws forwardly the standard I, and thereby elevates the beam. Slight exertion only on the part of the operator is necessary to bring the lifting-spring forward of its pivotal point P', which being the center of gravity the action of the said spring will continue such forward movement with no assistance from the operator. When the beam is so elevated, (which is necessary in passing over obstructions or turning at the ends of rows,) the traction of the wheels on the ground will throw the cultivator-frame forward, as shown in Fig. 2, in which position the cultivator is evenly balanced with the driver in the seat, and the pole is thus prevented from lifting up on the horses' necks. The position of the upper end of the lifting-spring Q with reference to the relative positions of said end and the pivot P' when the beam is lowered may be regulated by the operator by means of a thumb-screw S, which passes through the spring-support P and may be screwed against the under side of the axle-box P'', and thus a forward or backward adjustment of the lifting-spring may be had.

In Figs. 4 and 5 the structural modification or variation consists in dispensing with the brace-bar O and slide N and in bolting the drag-bar M directly to the cultivator-frame A. This of course will fix the relative positions of the frame and the wheel-spindles, and to this extent only does the invention differ from the description in connection with Figs. 1 and 2.

Having fully described my invention, I claim—

1. In a riding-cultivator, the combination with a frame, and a cultivator-beam pivotally connected to said frame, of a beam-standard pivotally connected to said beam, and a lifting-spring having a pivotal connection at a point rearward of the wheel-axle, and a pivotal connection with the beam-standard, substantially as shown and for the purposes specified.

2. In a riding-cultivator, the combination with a frame, and a wheel-axle connected therewith, of a cultivator-beam pivotally connected with said frame, an adjustable beam-standard pivotally connected to said cultivator-beam, a lifting-spring pivotally connected to said beam-standard, and a support to which said lifting-spring is rigidly connected, said support having a pivotal connection at a point rearward of the wheel-axle, substantially as and for the purposes specified.

3. In a cultivator, the combination with a frame, an arched axle upon which said frame is mounted, cultivator-beams pivotally connected to said frame, and beam-standards pivotally connected to said cultivator-beams, of a curved lifting-spring one end of which is pivotally supported at a point in the rear of the wheel-axle, and the other end of which has a swivel connection with the beam-standards at a point rearward of the wheel-axle, whereby the cultivator-beams may be raised or lowered, substantially as specified.

4. In a riding-cultivator, the combination with a frame, a wheel-axle connected therewith, cultivator-beams, and beam-standards pivotally connected to said cultivator-beams, of a curved lifting-spring having a swivel connection with the beam-standards in a vertical plane rearward of the wheel-axle, and a pivotal support rearward of the wheel-axle, whereby the relative position of the frame and the wheel-spindles may be changed, substantially as described.

5. In a riding-cultivator, the combination with a frame, a wheel-axle, cultivator-beams, and beam-standards pivoted to said cultivator-beams, of a curved spring having a swivel connection with said beam-standards and a pivotal support rearward of the wheel-axle, whereby, when the beam-standards are moved forward to an extent that moves the upper ends of the springs forward of the pivotal support of said springs, the cultivator-beams will be elevated by the strength of said springs, substantially as specified.

6. In a riding-cultivator, the combination with a frame having an axle terminating in wheel-spindles and a cultivator-beam pivotally connected with said frame, of an upright standard pivotally connected with said beam, a lifting-spring connected with said standard said spring having a pivotal connection rearward of the axle, a slide mounted in the frame, and bars pivotally connected to said slide and to a wheel-spindle and the lifting-spring respectively, substantially as and for the purposes specified.

7. An even-balanced cultivator comprising a frame, an arched axle having wheel-spindles, a cultivator-beam pivotally connected to said frame, an upright standard pivotally connected to said beam, a lifting-spring pivotally connected to said standard, a support to which said spring is attached, said support having a pivotal connection rearward of the axle, whereby when the standard is moved forward to an extent that moves the upper end of the spring forward of said pivotal point, the spring will elevate the beams and enable a forward shifting of the frame, a drag-bar connected to the wheel-spindle, a brace pivotally connected to the spring-support, and a slide to which said drag-bar and brace are pivotally connected, whereby means are provided for enabling a shifting of the positions of the frame, substantially as described.

8. In a riding-cultivator, the combination with a suitable frame having wheel-spindles connected therewith, a cultivator-beam, and an upright standard pivotally connected to said beam, of a lifting-spring connected to said standard and controlling the cultivator-beam, a support for said lifting-spring having a pivotal connection rearward of the axle, and connections between the wheel-spindles and said spring which enable a forward shifting of the frame when the lifting-spring elevates the cultivator-beam, substantially as shown and described.

9. In a cultivator, the combination of beams, beam-standards pivotally connected to said beams, curved lifting-springs having swivel connections with the upper ends of said beam-standards, and supports to which said springs are connected, the said supports having a pivotal connection in the rear of the wheel-axle, substantially as specified.

10. In a cultivator, the combination of beams, beam-standards pivotally connected to said beams, curved lifting-springs having swivel connections with the upper portions of said beam-standards, supports for said lifting-springs, said supports having pivotal connections rearward of the wheel-axle, and connections between the wheel-spindles and said springs which enable a forward shifting of the frame when the lifting-springs elevate the cultivator-beams, substantially as described.

In testimony whereof I affix my signature in presence of two witnesses.

ANDREW V. RYDER.

Witnesses:
RUPERT R. BERTHAM,
WILLIAM T. PERRY.